United States Patent
Collins et al.

(10) Patent No.: US 9,112,620 B2
(45) Date of Patent: Aug. 18, 2015

(54) METHOD OF ENABLING POWER SAVINGS WHEN NO DATA IS BEING TRANSMITTED ON A MEDIA LOGICAL CHANNEL

(75) Inventors: Bruce Collins, San Diego, CA (US); Shusheel Gautam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 580 days.

(21) Appl. No.: 11/369,376

(22) Filed: Mar. 6, 2006

(65) Prior Publication Data

US 2006/0258410 A1 Nov. 16, 2006

Related U.S. Application Data

(60) Provisional application No. 60/660,897, filed on Mar. 10, 2005.

(51) Int. Cl.
| | |
|---|---|
| *H04M 1/00* | (2006.01) |
| *H04H 40/18* | (2008.01) |
| *H04B 1/16* | (2006.01) |
| *H04W 52/02* | (2009.01) |

(52) U.S. Cl.
CPC ............. *H04H 40/18* (2013.01); *H04B 1/1615* (2013.01); *H04W 52/0229* (2013.01); *Y02B 60/50* (2013.01)

(58) Field of Classification Search
CPC . H04W 72/005; H04W 4/06; H04W 52/0216; H04W 52/02; H04W 28/06; H04W 28/22; Y02B 60/50
See application file for complete search history.

(56) References Cited

U.S. PATENT DOCUMENTS

| | | | |
|---|---|---|---|
| 2002/0146985 A1 | 10/2002 | Naden | |
| 2004/0057387 A1* | 3/2004 | Yi et al. | 370/252 |
| 2004/0253996 A1* | 12/2004 | Chen et al. | 455/574 |
| 2005/0003794 A1 | 1/2005 | Liu | |
| 2005/0101319 A1* | 5/2005 | Murali et al. | 455/434 |
| 2006/0018268 A1* | 1/2006 | Kakani et al. | 370/278 |
| 2007/0076639 A1* | 4/2007 | Chou | 370/310 |

FOREIGN PATENT DOCUMENTS

| | | |
|---|---|---|
| EP | 0891046 A2 | 1/1999 |
| EP | 1071221 A1 | 1/2001 |
| EP | 1071221 A1 * | 1/2001 |
| JP | 2001345752 A | 12/2001 |
| JP | 2002300175 A | 10/2002 |

(Continued)

OTHER PUBLICATIONS

International Search Report—PCT/US2006/008613, International Search Authority—European Patent Office—Jun. 16, 2006.

(Continued)

*Primary Examiner* — Khalid Shaheed
*Assistant Examiner* — Shantell L Heiber
(74) *Attorney, Agent, or Firm* — Arent Fox LLP (57) ABSTRACT

Provided is a method and system for determining sleep periods within a communications device configured to communicate via a network. The method includes analyzing at least one of two or more data fields related to a data unit and determining device sleep periods based upon the analysis. The analysis includes determining whether or not particular MediaFLO Logical Channel data (MLC) is present within an overhead information symbols channel. If MLC data is not present, the device sleeps for a predetermined amount of time.

18 Claims, 9 Drawing Sheets

(56) References Cited

FOREIGN PATENT DOCUMENTS

| | | |
|---|---|---|
| JP | 2003087185 A | 3/2003 |
| JP | 2003179539 A | 6/2003 |
| JP | 2004320153 A | 11/2004 |
| TW | 200428812 | 12/2004 |

OTHER PUBLICATIONS

Written Opinion—PCT/US2006/008613. International Search Authority—European Patent Office—Jun. 16, 2006.

International Preliminary Report on Patentability—PCT/US2006/008613, International Bureau of WIPO—Geneve, Switzerland—Sep. 12, 2007.

Taiwan Search Report—TW095108155—TIPO—Sep. 26, 2011.

Translation of Office Action issued by Chinese Patent Office on Feb. 25, 2014 in connection with the corresponding Chinese application No. 200680014870.

Translation of First Office Action for Japanese Application No. 2013-264683, dated Aug. 19, 2014, 3 pages.

* cited by examiner

METHOD OF ENABLING POWER SAVINGS WHEN NO DATA IS BEING TRANSMITTED ON A MEDIA LOGICAL CHANNEL

CROSS-REFERENCE TO RELATED APPLICATIONS

The present Application claims priority under 35 U.S.C. §119 to Provisional Application No. 60/660,897, filed on Mar. 10, 2005, and assigned to the assignee hereof and hereby expressly incorporated by reference herein.

BACKGROUND

1. Field of the Invention

The present invention relates generally to power savings in a communications network. More specifically, the present invention relates to determining periods of interrupted data transmission to facilitate power savings in a wireless communications network.

2. Background Art

FLO is a technology designed primarily for the efficient and economical distribution of the same multimedia content to millions of wireless subscribers simultaneously. The goal of FLO technology is to reduce costs associated with delivering such content and allow users to surf channels of content on the mobile handsets typically used for traditional cellular voice and data services. This multimedia content is also known as services. A service is an aggregation of one or more independent data components. Each independent data component of a service is called a flow.

Services are classified into two types based on their coverage: Wide-area services and Local-area services. A Local-area service is multicast for reception within a metropolitan area. By contrast, Wide-area services are multicast in one or more metropolitan areas.

FLO services are carried over one or more logical channels, known as MediaFLO™ Logical Channels or MLCs. An MLC may be divided into a maximum of three logical sub-channels. These logical sub-channels are called streams. Each flow is carried in a single stream.

Typically FLO networks transmit the content for a service or MLC, every super-frame. There can be intermittent periods when there is no data being transmitted by the network for a certain duration on the MLC. If the device is forced to search for the MLC during these intermittent time periods, the device will be forced to consume power by performing this unnecessary search. This unnecessary power consumption will ultimately reduce battery life.

What is needed, therefore, is a system and method that will provide the device with information about these intermittent time periods. Knowledge of this information will enable the device to perform certain power saving operation like putting the receiver hardware in sleep mode, for the time interval when the data will not be available.

SUMMARY

Consistent with the principles of the present invention as embodied and broadly described herein, the present invention includes a method for determining sleep periods within a communications device configured to communicate via a network. The method includes analyzing at least one of two or more data fields related to a data unit and determining device sleep periods based upon said analysis.

In another aspect, an apparatus determines sleep periods within a communications device. The apparatus includes means for analyzing at least one of two or more data fields related to a data unit and means for determining device sleep periods based upon the analysis.

In yet another aspect, a transceiver determines sleep periods associated with communicating via a network. The transceiver includes a processor configured to analyze at least one of two or more data fields related to a data unit and a timer for determining device sleep periods based upon the analysis.

In another aspect, a computer readable medium carrying one or more sequences of one or more instructions for execution by one or more processors to perform a method of determining sleep periods within a communications device. The instructions when executed by the one or more processors, cause the one or more processors to perform the steps of analyzing at least one of two or more data fields related to a data unit and determining device sleep periods based upon the analysis.

For an MLC that is currently being transmitted, the network may transmit data every super-frame. However, the network is not prohibited from temporarily halting transmission on that MLC for a certain time period. For this case, a device that is monitoring this particular MLC may implement power saving functions, such as receiver sleep mode, during the time period for which there is no MLC data available.

An overhead information symbols (OIS) system parameters message as well as an OIS capsule header carried as a part of the MLC data, carries information on when the network is expected to resume transmitting data on a particular MLC. This information is specified in terms of an offset in the number of super-frames. This offset ensures that the network will not transmit the data on the particular MLC before the specified offset. The device may use the time period indicated by this offset to perform any power saving functions.

The OIS and an embedded OIS (discussed more fully below) carry information regarding the time interval (offset in super-frames) for which no data will be available associated with a particular MLC. In other words, this field guarantees that no data will be transmitted by the network for that MLC, for at least the specified time interval. This enables the device to sleep for that duration resulting in decreased power consumption and consequently increased battery life.

Further features and advantages of the present invention as well as the structure and operation of various embodiments of the present invention, are described in detail below with reference to the accompanying drawings.

BRIEF DESCRIPTION OF THE DRAWINGS

The accompanying drawings, which are incorporated herein and constitute part of the specification, illustrate embodiments of the present invention and, together with the general description given above and the detailed description of the embodiments given below, serve to explain the principles of the invention. In the drawings.

DETAILED DESCRIPTION

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appended claims.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

It would be apparent to one skilled in the art that the present invention, as described below, may be implemented in many different embodiments of hardware, software, firmware, and/or the entities illustrated in the drawings. Any actual software code with the specialized controlled hardware to implement the present invention is not limiting of the present invention. Thus, the operation and behavior of the present invention will be described with the understanding that modifications and variations of the embodiments are possible, given the level of detail presented herein.

Figure 1:
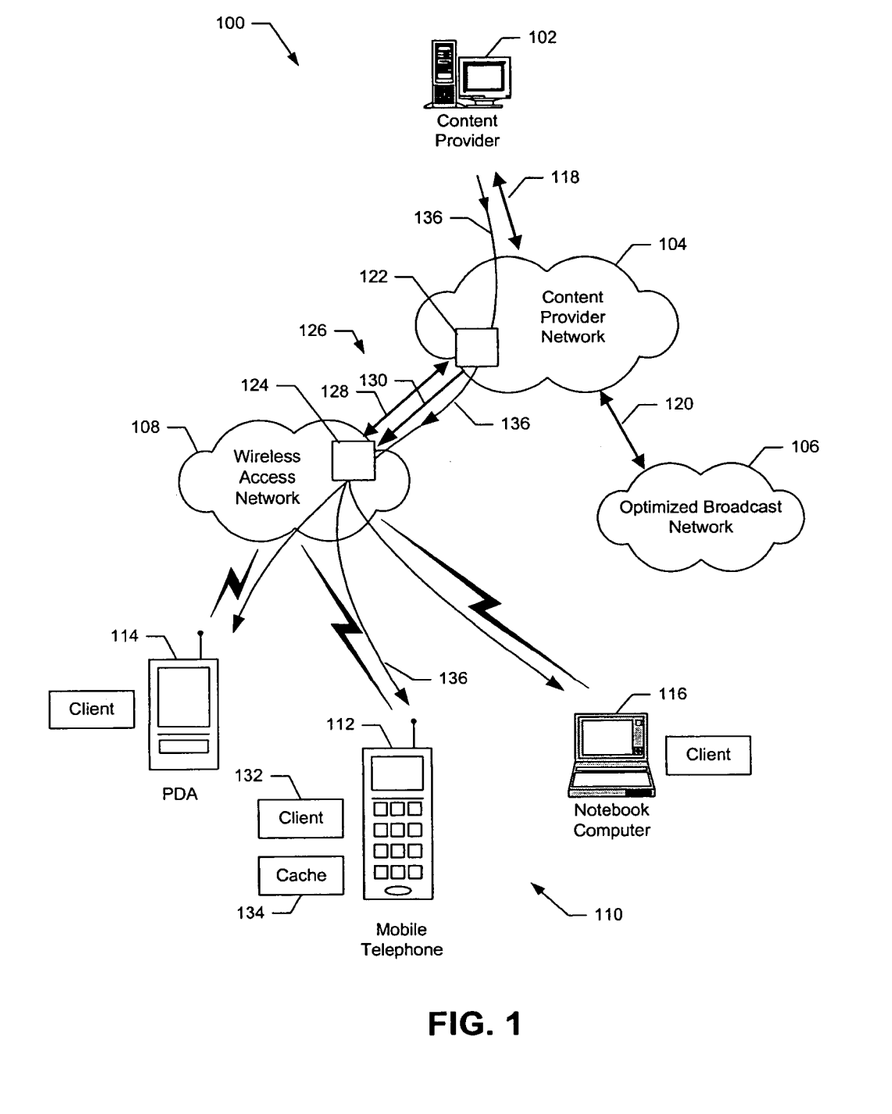
FIG. 1 is an illustration of a network including one embodiment of a content delivery system.

FIG. 1 shows a communication network 100 that comprises a transport system 136 that operates to create and transport multimedia content flows across data networks. For example, the transport system 136 is consistent with the principles of the FLO system, noted above, and is suitable for use in transporting content clips from a content provider network to a wireless access network for broadcast distribution.

The network 100 comprises a content provider (CP) 102, a content provider network 104, an optimized broadcast network 106, and a wireless access network 108. The network 100 also includes devices 110 that comprise a mobile telephone 112, a personal digital assistance (PDA) 114, and a notebook computer 116. The devices 110 illustrate just some of the devices that are suitable for use with the transport system 136. It should be noted that although three devices are shown in FIG. 1, virtually any number of analogous devices, or types of devices are suitable for use in the transport system 136, as would be apparent to those skilled in the relevant art.

The content provider 102 operates to provide content for distribution to users in the network 100. The content comprises video, audio, multimedia content, clips, real-time and non real-time content, scripts, programs, data or any other type of suitable content. The content provider 102 provides the content to the content provider network 104 for distribution. For example the content provider 102 communicates with the content provider network 104 via the communication link 118, which comprises any suitable type of wired and/or wireless communication link.

The content provider network 104 comprises any combination of wired and wireless networks that operate to distribute content for delivery to users. The content provider network 104 communicates with the optimized broadcast network 106 via the link 120. The link 120 comprises any suitable type of wired and/or wireless communication link. The optimized broadcast network 106 comprises any combination of wired and wireless networks that are designed to broadcast high quality content. For example, the optimized broadcast network 106 may be a specialized proprietary network that has been optimized to deliver high quality content to selected devices over a plurality of optimized communication channels.

The transport system 136 operates to deliver content from the content provider 102 for distribution to a content server (CS) 122 at the content provider network 104 that operates to communicate with a broadcast base station (BBS) 124 at the wireless access network. The CS 122 and the BBS 124 communicate using one or more embodiments of a transport interface 126 that allows the content provider network 104 to deliver content in the form of content flows to the wireless access network 108 for broadcast/multicast to the devices 110. The transport interface 126 comprises a control interface 128 and a bearer channel 130. The control interface 128 operates to allow the CS 122 to add, change, cancel, or otherwise modify contents flows that flow from the content provider network 104 to the wireless access network 108. The bearer channel 130 operates to transport the content flows from the content provider network 104 to the wireless access network 108.

The CS 122 uses the transport interface 126 to schedule a content flow to be transmitted to the BBS 124 for broadcast/multicast over the wireless access network 108. For example, the content flow may comprise a non real-time content clip that was provided by the content provider 102 for distribution using the content provider network 104. The CS 122 operates to negotiate with the BBS 124 to determine one or more parameters associated with the content clip. Once the BBS 124 receives the content clip, it broadcasts/multicasts the content clip over the wireless access network 108 for reception by one or more of the devices 110. Any of the devices 110 may be authorized to receive the content clip and cache it for later viewing by the device user.

In the foregoing example, the device 110 comprises a client program 132 that operates to provide a program guide that displays a listing of content that is scheduled for broadcast over the wireless access network 108. The device user may then select to receive any particular content for rendering in real-time or to be stored in a cache 134 for later viewing. For example the content clip may be scheduled for broadcast during the evening hours, and the device 112 operates to receive the broadcast and cache the content clip in the cache 134 so that the device user may view the clip the next day. Typically, the content is broadcast as part of a subscription service and the receiving device may need to provide a key or otherwise authenticate itself to receive the broadcast.

The transport system 136 allows the CS 122 to receive program-guide records, Program contents, and other related information from content provider 102. The CS 122 updates and/or creates content for delivery to devices 110.

Figure 2:
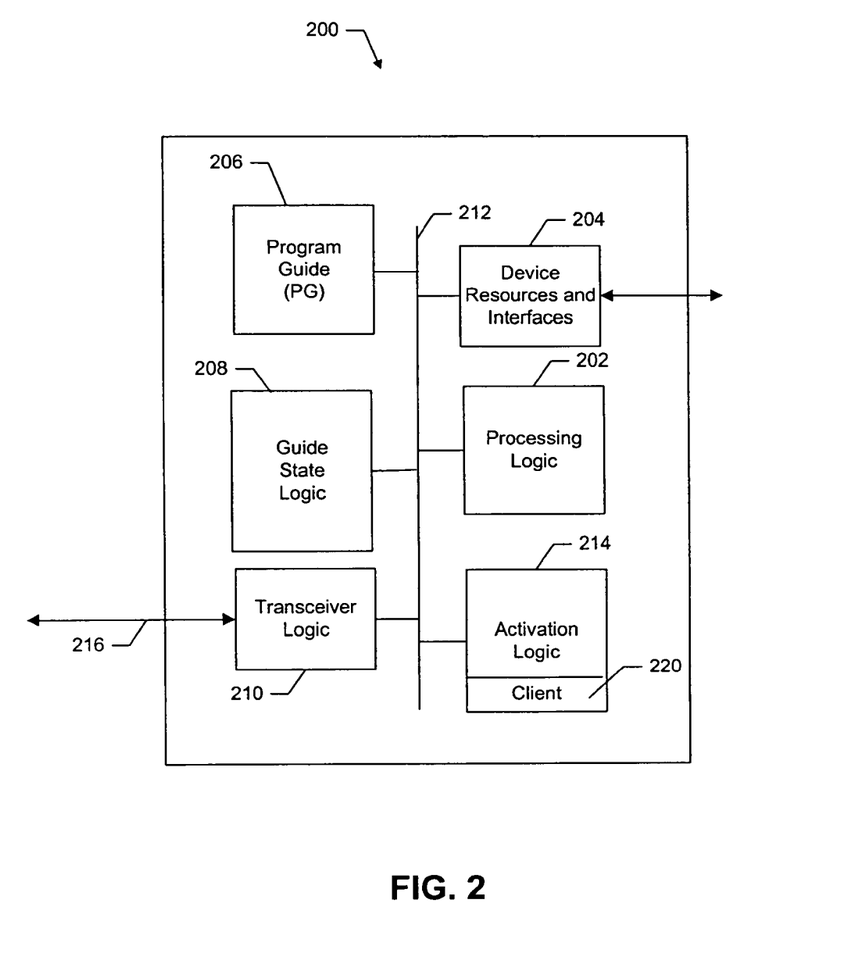
FIG. 2 is an illustration of one embodiment of a content provider suitable for use in the content delivery system of FIG. 1.

FIG. 2 shows a content provider server 200 suitable for use in the content delivery system. For example, the server 200 may be used as the server 102 in FIG. 1. The server 200 comprises processing logic 202, resources and interfaces 204, and transceiver logic 210, all coupled to an internal data bus 212. The server 200 also comprises activation logic 214, PG 206, and Guide State logic 208, which are also coupled to the data bus 212.

The processing logic 202 comprises a central processing unit (CPU), processor, gate array, hardware logic, memory elements, virtual machine, software, and/or any combination of hardware and software. Thus, the processing logic 202 generally comprises logic to execute machine-readable instructions and to control one or more other functional elements of the server 200 via the internal data bus 212.

The resources and interfaces 204 comprise hardware and/or software that allow the server 200 to communicate with internal and external systems. For example, the internal systems may include mass storage systems, memory, display driver, modem, or other internal device resources. The external systems may include user interface devices, printers, disk drives, or other local devices or systems.

The transceiver logic 210 comprises hardware logic and/or software that operates to allow the server 200 to transmit and receive data and/or other information with remote devices or systems using communication channel 216. For example, the communication channel 216 comprises any suitable type of communication link to allow the server 200 to communicate with a data network.

The activation logic 214 comprises a CPU, processor, gate array, hardware logic, memory elements, virtual machine, software, and/or any combination of hardware and software. The activation logic 214 operates to activate a CS and/or a device to allow the CS and/or the device to select and receive content and/or services described in the PG 206. The activation logic 214 transmits a client program 220 to the CS and/or the device during the activation process. The client program 220 runs on the CS and/or the device to receive the PG 206 and display information about available content or services to the device user. Thus, the activation logic 214 operates to authenticate a CS and/or a device, download the client 220, and download the PG 206 for rendering on the device by the client 220.

The PG 206 comprises information in any suitable format that describes content and/or services that are available for devices to receive. For example, the PG 206 may be stored in a local memory of the server 200 and may comprise information such as content or service identifiers, scheduling information, pricing, and/or any other type of relevant information. The PG 206 comprises one or more identifiable sections that are updated by the processing logic 202 as changes are made to the available content or services.

The Guide State logic 208 comprises hardware and/or software that operates to generate notification messages that identify and/or describe changes to the PG 206. For example, when the processing logic 202 updates the PG 206, the PG records logic 208 is notified about the changes. The Guide State logic 208 then generates one or more notification messages that are transmitted to CSs, which may have been activated with the server 200, so that these CSs are promptly notified about the changes to the PG 206.

As part of the content delivery notification message, a broadcast indicator is provided that indicates when a section of the PG identified in the message will be broadcast. For example, the broadcast indicator may comprise one bit to indicate that the section will be broadcast and a time indicator that indicates when the broadcast will occur. Thus, the CSs and/or the devices wishing to update their local copy of the PG records can listen for the broadcast at the designated time to receive the updated section of the PG records.

In one embodiment, the content delivery notification system comprises program instructions stored on a computer-readable media, which when executed by a processor, for instance, the processing logic 202, provides the functions of the server 200 described herein. For example, the program instructions may be loaded into the server 200 from a computer-readable media, such as a floppy disk, CDROM, memory card, FLASH memory device, RAM, ROM, or any other type of memory device or computer-readable media that interfaces to the server 200 through the resources 204. In another embodiment, the instructions may be downloaded into the server 200 from an external device or network resource that interfaces to the server 200 through the transceiver logic 210. The program instructions, when executed by the processing logic 202, provide a guide state notification system as described herein.

Figure 3:
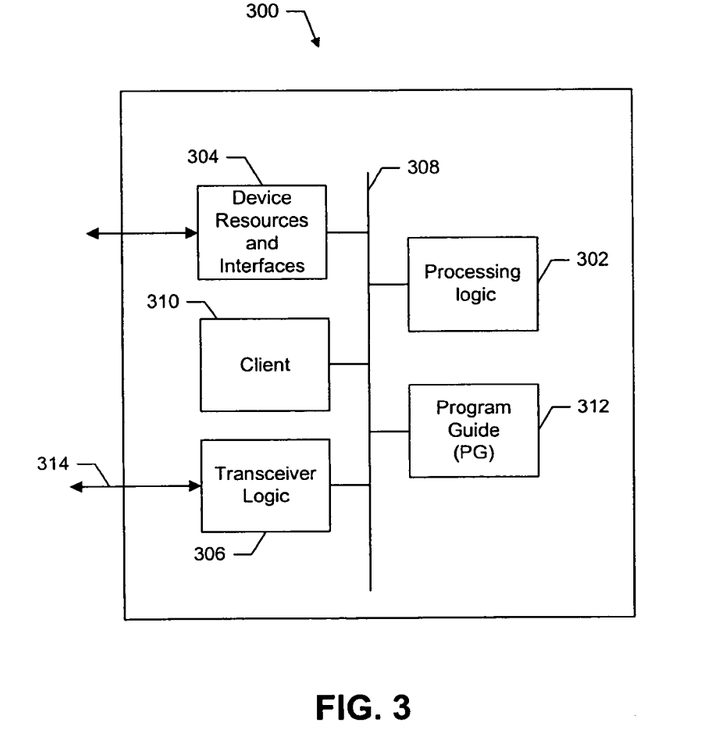
FIG. 3 is an illustration of one embodiment of a content server suitable for use in the content delivery system.

FIG. 3 shows a content server (CS) or device 300 suitable for use in a content delivery system. For example, CS 300 may be the CS 122 shown in FIG. 1. The CS 300 comprises processing logic 302, resources and interfaces 304, and transceiver logic 306, all coupled to a data bus 308. The CS 300 also comprises a client 310, and a Program Guide PG logic 312, which are also coupled to the data bus 308.

The processing logic 302 comprises a CPU, processor, gate array, hardware logic, memory elements, virtual machine, software, and/or any combination of hardware and software. Thus, the processing logic 302 generally comprises logic configured to execute machine-readable instructions and to control one or more other functional elements of the CS 300 via the internal data bus 308.

The resources and interfaces 304 comprise hardware and/or software that allow the CS 300 to communicate with internal and external systems. For example, internal systems may include mass storage systems, memory, display driver, modem, or other internal device resources. The external systems may include user interface devices, printers, disk drives, or other local devices or systems.

The transceiver logic 306 comprises hardware and/or software that operate to allow the CS 300 to transmit and receive data and/or other information with external devices or systems through communication channel 314. For example, the communication channel 314 may comprise a network communication link, a wireless communication link, or any other type of communication link.

During operation, the CS 300 is activated so that it may receive available content Or services over a data network. For example, the CS 300 identifies itself to a content provider server during an activation process. As part of the activation process, the CS 300 receives and stores PG records by PG logic 312. The PG 312 contains information that identifies content or services available for the CS 300 to receive. The client 310 operates to render information in the PG logic 312 on the CS and/or the device 300 using the resources and interfaces 304. For example, the client 310 renders information in the PG logic 312 on a display screen that is part of the device. The client 310 also receives user input through the resources and interfaces so that a device user may select content or services.

The CS 300 receives notification messages through the transceiver logic 306. For example, the messages may be broadcast or unicast to the CS 300 and received by the transceiver logic 306. The PG notification messages identify updates to the PG records at the PG logic 312. In one embodiment, the client 310 processes the PG notification messages to determine whether the local copy at the PG logic 312 needs to be updated. For example, in one embodiment, the notification messages include a section identifier, start time, end time, and version number.

The CS 300 operates to compare the information in the PG notification messages to locally stored information at the existing PG logic 312. If the CS 300 determines from the PG notification messages that one or more sections of the local copy at the PG logic 312 needs to be updated, the CS 300 operates to receive the updated sections of the PG in one of several ways. For example, the updated sections of the PG may be broadcast at a time indicated in the PG notification messages, so that the transceiver logic 306 may receive the broadcasts and pass the updated sections to the CS 300, which in turn updates the local copy at the PG logic 312.

The CS 300 determines which sections of the PG need to be updated based on the received PG update notification messages, and transmits a request to a CP server to obtain the desired updated sections of the PG. For example, the request may be formatted using any suitable format and comprise information such as a requesting CS identifier, section identifier, version number, and/or any other suitable information.

The CS 300 performs one or more of the following functions in one or more embodiments of a PG notification system. It should be noted that the following functions might be changed, rearranged, modified, added to, deleted, or otherwise adjusted within the scope of the invention.

1. The CS is activated for operation with a content provider system to receive content or services. As part of the activation process, a client and PG are transmitted to the CS.

2. One or more PG notification messages are received by the CS and used to determine if one or more sections of the locally stored PG need to be updated.

3. In one embodiment, if the CS determines that one or more sections of the locally stored PG need to be updated, the CS listens to a broadcast from the distribution system to obtain the updated sections of the PG that it needs to update its local copy.

4. In another embodiment, the CS transmits one or more request messages to the CP to obtain the updated sections of the PG it needs.

5. In response to the request, the CP transmits the updated sections of the PG to the CS.

6. The CS uses the received updated sections of the PG to update its local copy of the PG.

The content delivery system comprises program instructions which may be stored on a computer-readable media, which when executed by a processor, such as the processing logic 302, provides the functions of the content delivery notification system as described herein. For example, instructions may be loaded into the CS 300 from a computer-readable media, such as a floppy disk, CDROM, memory card, FLASH memory device, RAM, ROM, or any other type of memory device or computer-readable media that interfaces to the CS 300 through the resources and interfaces 304. In another embodiment, the instructions may be downloaded into the CS 300 from a network resource that interfaces to the CS 300 through the transceiver logic 306. The instructions, when executed by the processing logic 302, provide a content delivery system as described herein.

It should be noted that the CS 300 represents just one implementation and that other implementations are possible within the scope of the invention.

Figure 4:
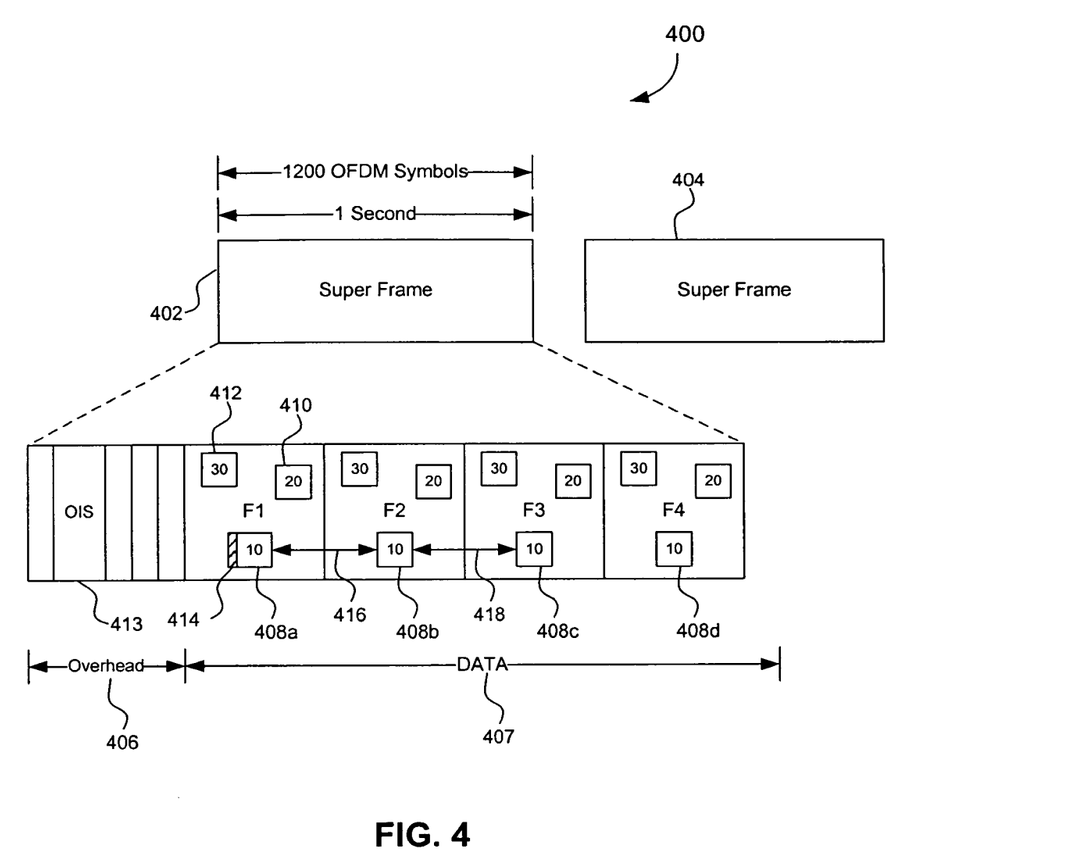
FIG. 4 is an illustration of an exemplary super-frame in accordance with the embodiment.

FIG. 4 is an illustration of a segment 400 of a transmitted signal within network 100. For purposes of illustration, signal transmission throughout the network 100 can include orthogonal frequency division multiplexed (OFDM) principles. Transmitted signals in the network 100 are organized into super-frames, which are units of data transmission in a physical layer of the network 100. As well understood by those of skill in the art, the network physical layer provides the channel structure, frequency, power output, modulation and encoding specification for the network's Forward Link.

In FIG. 4, the segment 400 includes representative super-frames 402 and 404. Each of the super-frames 402 and 404 has a duration of about one second and includes content related to OFDM symbols. In the example of FIG. 4, each of the super-frames 402 and 404 includes about 1200 OFDM symbols, although this particular number (1200) is transparent to implementation of embodiments of the instant invention.

Within each of the super-frames 402 and 404, for example, certain of the 1200 symbols are representative of overhead information and certain of the symbols are representative of actual data. Such data can include, for example, video data and audio data related to a flow multicast.

As mentioned above, the FLO based network 100 multicasts several services as an aggregation of one or more independent data components. Each independent data component is called a flow and can include a video component, audio component, text or signaling component of a service. FLO services are carried over one or more logical channels MLCs.

In the exemplary illustration of FIG. 4, the representative super-frame 402 includes an overhead portion 406 and a data portion 407. The data portion 407 is further subdivided to include data frames F1-F4. At the physical layer of the network 100, MLCs are transported within the data portion 407. As a practical matter, a transported MLC will be divided across the data frames F1-F4. In the exemplary data portion 407 of FIG. 4, three MLCs (10, 20, and 30) are divided across the data frames F1-F4. That is, one fourth of the content of each of the MLCs 10, 20, and 30 is carried in each of the frame F1-F4, respectively.

For example, the MLC having identification (ID) 10 is divided into portions 408a-408d, each corresponding to one of the frames F1-F4. Thus, the frame F1 also includes MLC portions 410 and 412, corresponding to the MLCs 20 and 30, respectively, as well as the portion 408a, which corresponds to the MLC 10.

Figure 5:
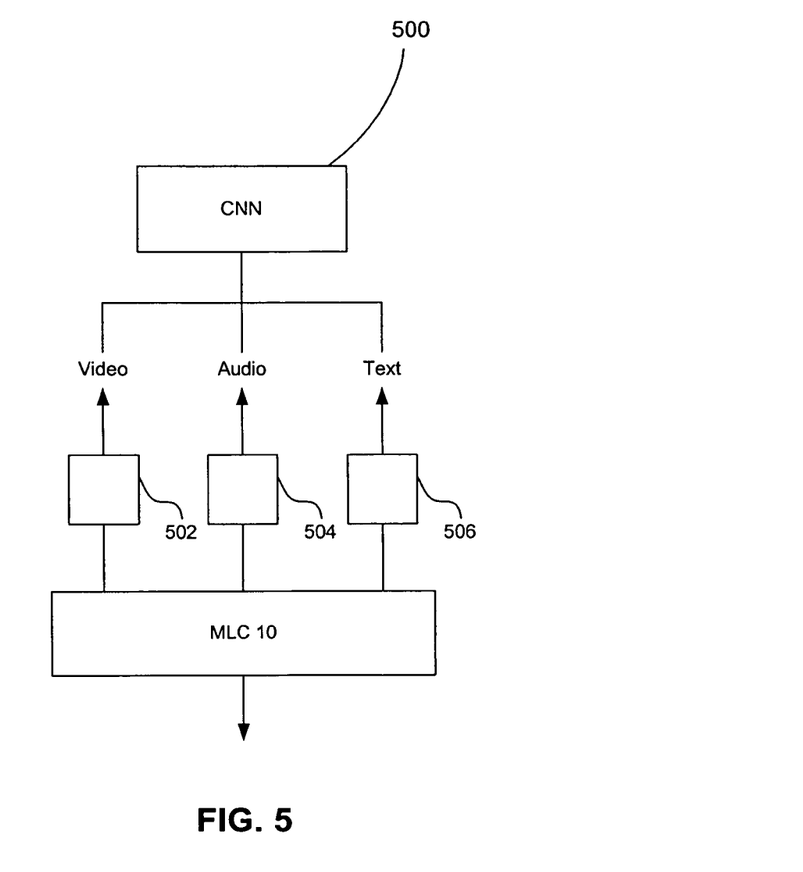
FIG. 5 is a block diagram illustration of an exemplary services flow in accordance with the embodiment.

From another perspective, an MLC is a logical grouping at the physical layer that is configured to carry unique data. At the application layer, data, also known as flows, are carried in entities known as streams. The Application layer provides services for an application to ensure that effective communication with another application program in a network is possible. The streams are in turn, carried in MLCs. For example, a single MLC can carry up to three streams (i.e., up to three different flows of different application level data). FIG. 5 is an illustration of the relationship between a flow, a stream, and an MLC in accordance with principles of the present embodiment.

In FIG. 5, an exemplary flow 500 might include information downloaded to the device 112 from a video mobile service provided, for example, by the cable news network (CNN). This broadcast from CNN can include application level data in the form of a video stream 502, an audio stream 504, and a text stream 506. Each of the streams 502, 504, and 506, carrying unique data, will be transmitted in the physical layer of the network 100 within the uniquely identifiable MLC 10.

Referring back to FIG. 4, one fourth of the MLC 10, which carries the streams 502, 504, and 506, is carried in each of the frames F1-F4 of the super-frame 402 in the form of the portions 408a-408d, respectively.

Within the network 110, a super-frame can also be viewed as a network pipe. Different MLCs corresponding to different flows are carried within this network pipe, such as the super-frame 402. For example, an ESPN flow and a MSNBC flow might also be carried with the super-frame 402, in addition to the CNN flow 500. The ESPN flow might be carried within the MLC 20 and the MSNBC flow might be carried within the MLC 30, shown in FIG. 4. A single super-frame can carry many different flows, each representing different data types. For purposes of illustration, the super-frames within the network 100, such as the super-frame 402, will be transmitted to one or more of the devices 110 at a rate of about one per second.

When a user initially selects a service, such as CNN, for use on the device 112, for example, that service will be mapped onto individual flows. Once the service has been mapped onto individual flows, each flow will be mapped to a specific MLC for physical transmission throughout the network 100. At this point, the device 112 will pick up the associated MLC ID that is actually being transmitted by the network 100.

Consider the example of FIGS. 4 and 5 where the audio stream 504 and the video stream 502, of the CNN flow 500, are being carried on the MLC 10. Here, the device 112 will seek to determine the MLC ID structure within the super-frame 402, and at least one subsequent super-frame, to determine the shape and location of the MLC 10. Thus, every second, the device is looking in a super-frame for the MLC 10.

Given inherent variabilities in transmitting large amounts of data, especially bandwidth intensive video data, the MLC 10 (i.e. CNN) may contain actual data in some super-frames, but in other super-frames, the MLC 10 may have no data at all. This intermittent presence of data in some MLCs and absence in others unnecessarily consumes valuable network power. This network power is unnecessarily consumed because the device 112 dissipates energy as it searches all received super-frames for the presence, shape, and location of the MLC of interest (e.g., MLC 10), whether an MLC is actually transmitted or not.

In the illustration of FIG. 4, before the device 112 can properly decode flow data transmitted within the MLC 10, the device 112 must first determine the shape and location of the MLC within the super-frame 402. This can be achieved two ways.

First, the overhead portion 406 of the super-frame 402 includes an OIS channel 413. The OIS channel 413, among other things, informs the device 112 of the location of the MLC 10 within the super-frame 402. Thus, when the device 112 initially requests service, it must first decode the OIS channel 413 within the super-frame 402 to know the precise location, and other characteristics, related to the MLC 10 before data within the MLC 10 can be unpacked and used.

After the device 112 decodes the OIS channel 413, it can then locate and unpack the flow data within the MLC 10. Specifically, the device 112 will first unpack the portion 408*a* of the MLC 10 located within the frame F1 of the super-frame 402. By way of background, all of the portions of an MLC, such as the MLC 10, are positioned at the same location within each frame of the associated super-frame. Therefore, since the device 112 knows that the subsequent portion 408*b* of the MLC 10 is located within the frame F2 at the same location as the portion 408*a* of the frame F1, the device 112 can sleep for a time period 416, prior to receiving the portion 408*b*.

At the end of the time period 416, the device 112 will awaken and proceed directly to the MLC portion 408*b*. The device 112 will unpack the portion 408*b*, then sleep for a period 418, and awaken to unpack the portion 408*c* within the frame F3, and so on. These periods of sleeping help reduce power consumption and preserve battery power.

A secondary source for location information related to MLCs is a segment 414 known as the embedded OIS, or MAC protocol capsule trailer. The protocol capsule trailer 414, however, only provides the device 112 with the location of the MLC 10 in super-frames occurring subsequent in time to the super-frame 402. Thus, as a minimum, each of the devices 110 must decode and read the OIS channel 413 in each current super-frame to determine the location of an associated MLC within a subsequent super-frame, whether or not an MLC is actually present in the subsequent super-frame. If a super-frame occurs on the average, once every second, then the device 110 must stop and search at least once per second for the MLC, regardless of whether the MLC is present or absent within a particular super-frame.

Once the device (e.g., the device 112) reads the OIS channel 413 and determines the location of the MLC 10 within the current super-frame 402, it must then also read the protocol capsule trailer 414 to determine the location of the MLC 10 in the subsequent super-frame (e.g., the super-frame 404).

Figure 6:
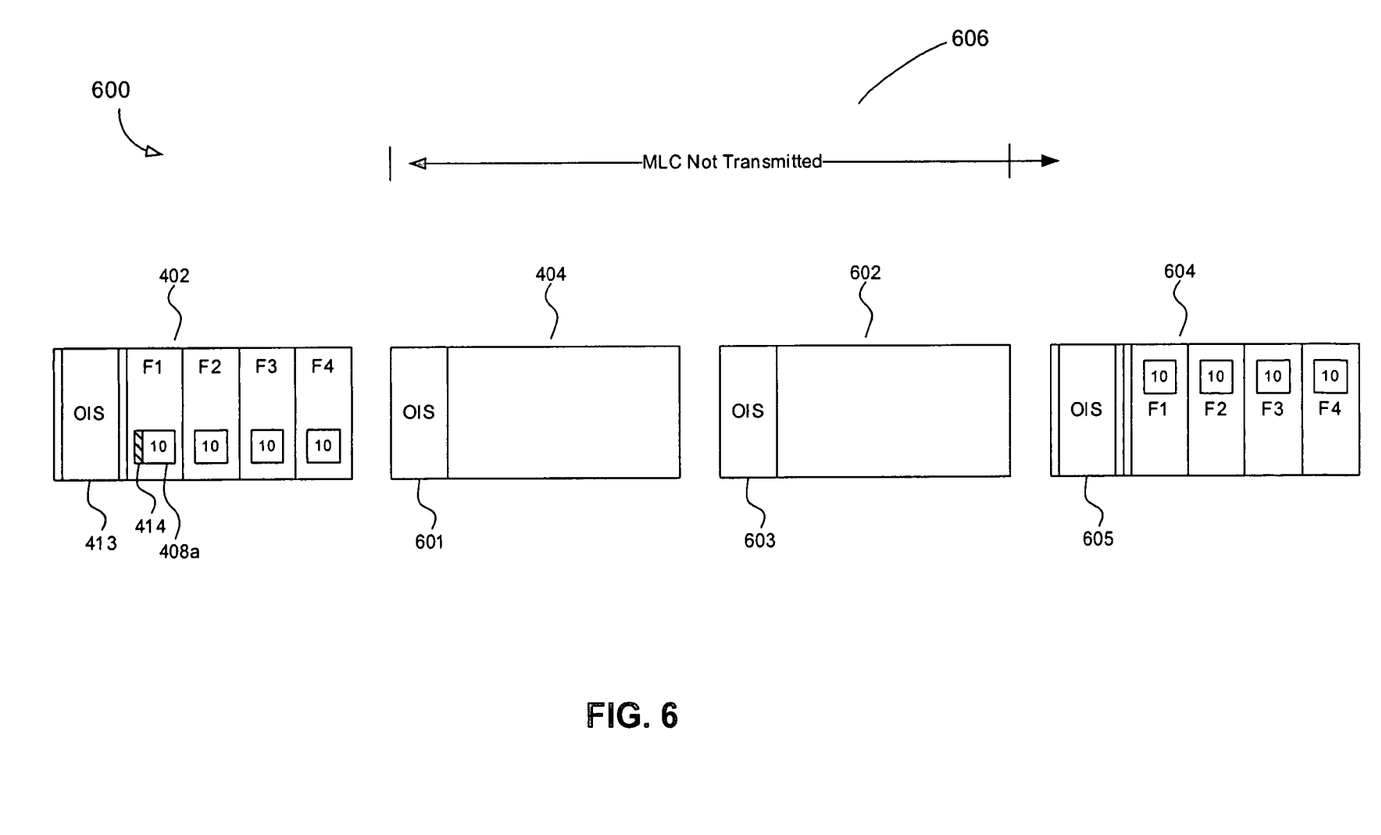
FIG. 6; is an illustration of the absence and presence of MLCs in associated contiguous super-frames.

FIG. 6 is an illustration of an absence and presence of MLCs in associated Contiguous super-frames 600. In FIG. 6, contiguously transmitted super-frames 402, 404, 602 and 604 are shown. As the super-frames 402, 404, 602, and 604 are transmitted, the device 112 must search each of these super-frames for the MLC of interest.

When the device 112, for example, receives the super-frame 402, it decodes the OIS channel 413 to determine the location of the MLC 10 within the super-frame 402. The device 112 then receives the MLC 10 and reads the protocol capsule trailer 414 within the portion 408*a* of the MLC 10 to determine the location of the MLC 10 within the next super-frame 404. After the device reads the remaining portions 408*b*-408*d* of the MLC 10, from the frames F2-F4, it then receives the super-frame 404. In receiving the super-frame 404, the device 112 then decodes an associated OIS channel 601 within the super-frame 404. In decoding the OIS channel 601, the device 112 discovers that the super-frame 404 does not include the MLC 10. Therefore, the device 112 proceeds to receive the super-frame 602 and decode its associated OIS channel 603. Similarly, the device 112 discovers that the MLC 10 is also absent from the super-frame 602.

Within the example of FIG. 6, the device 112 finally receives the super-frame 604 and decodes its OIS channel 605. In decoding the OIS channel 605, the device 112 determines the super-frame 604 includes the MLC 10, albeit in a different location than it was located in the super-frame 402. The issue, however, is that the device has wasted time searching the super-frames 404 and 602 only to discover that the MLC 10 was not transmitted at all during a time period 606, which corresponds to transmit time of the super-frames 404 and 602.

In reality, many consecutive super-frames may not include data related to the MLC 10. The MLC 10 data may be absent from the super-frames 404 and 602, and others, because of a variety of reasons, such as drop out or data corruption.

Figure 7:
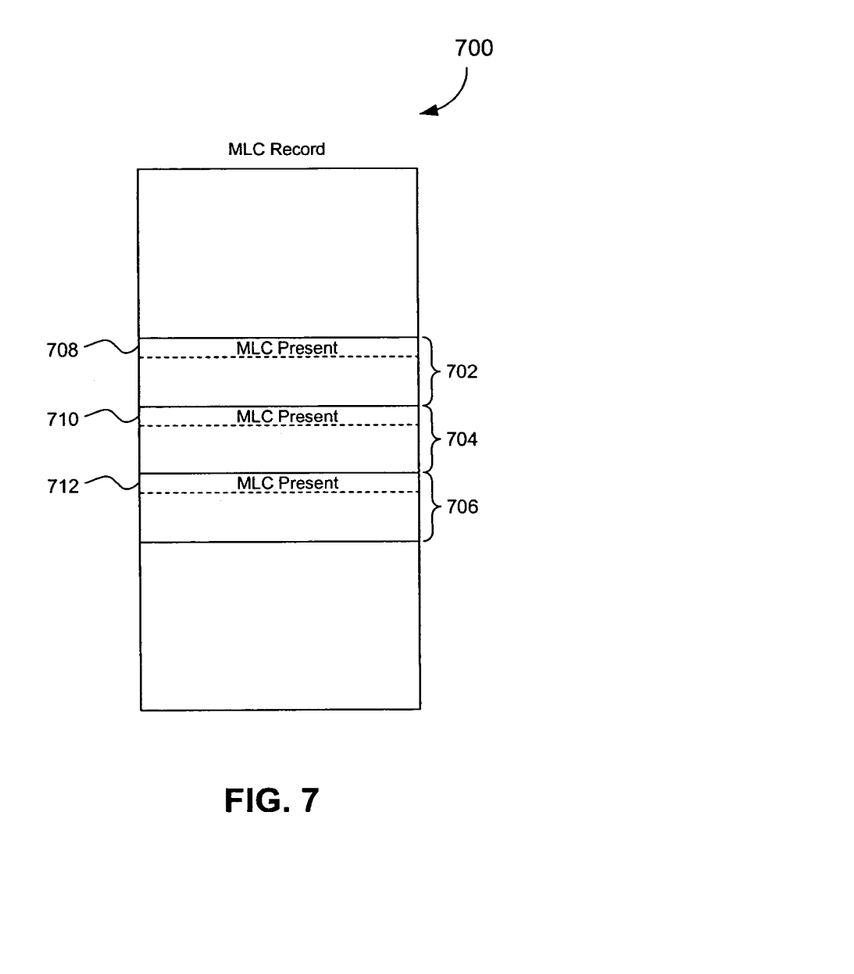
FIG. 7 is an illustration of an exemplary MLC record constructed in accordance with the embodiment.

FIG. 7 is an illustration of an exemplary MLC record 700 constructed in accordance with an embodiment of the present invention. The exemplary MLC record 700 enables the devices 110 to sleep through a predetermined number of super-frames in which associated MLC data is not present.

As stated above, the OIS channel (e.g., the channel 413) within the exemplary super-frame 402, includes information regarding the location of particular MLCs within a super-frame.

More specifically, as indicated in FIG. 7, the OIS channel includes an array including entries 702, 704, and 706, related to all MLCs that the network 100 is transmitting at any point in time. For example, the entries 702, 704, and 706 might include information related to the MLCs 10, 20, and 30 of FIG. 4, respectively. The array not only includes information about where each of the MLCs will be located within a current super-frame, but also includes information regarding MLC location within subsequent super-frames.

In FIG. 7, each of the entries 702, 704, and 706 also includes "MLC present" fields 708, 710, and 712, respectively. The MLC present fields 708, 710, and 712 also indicate whether the particular MLC is present within the current and subsequent super-frames. If an absence of MLCs is conveyed by the fields 708, 710, and 712, the fields will list from how many consecutive super-frames the particular MLC will be absent.

MLC presence or absence information is available to the network 100 because the network 100 may buffer 10 or more seconds (e.g., super-frames) worth of data before transmitting. Thus, the network 100 knows, within the buffered data, whether particular MLCs are present or not in a string of super-frames and can populate the MLC present field, such as the field 708, 710, and 712, accordingly.

Thus, in the example of FIG. 6, the MLC present fields within the OIS channel 413 can be set to indicate that the next two super-frames 404 and 602 will not include MLC 10 data. Thus, if the device knows apriorily that the super-frames 404 and 602 do not include MLC 10 data, the device 112 can sleep until a time in which the super-frame 604 will be received. In this manner, the device 112 will not be required to consume power unnecessarily by searching the super-frames 404 and 602, only to later discover that neither of these super-frames includes MLC 10 data. Sleeping through the super-frames 404 and 602, which do not include MLC 10 data, will further facilitate preservation of precious battery power and other related network resources.

Figure 8:
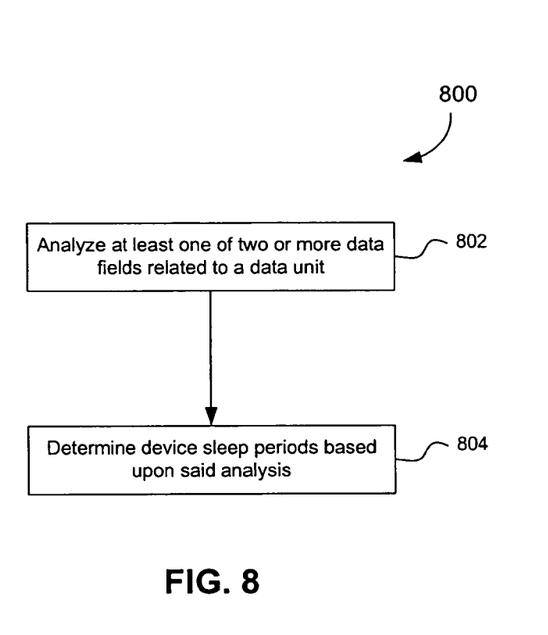
FIG. 8 is a flow diagram of an exemplary method of practicing the embodiment.

FIG. 8 is a flow diagram of an exemplary method 800 of practicing an embodiment of the present invention. In the method 800, a network device will analyze at least one of two or more data fields related to a data unit, as indicated in step 802. In step 804, the network device will determine device sleep periods based upon the analysis in step 802.

Figure 9:
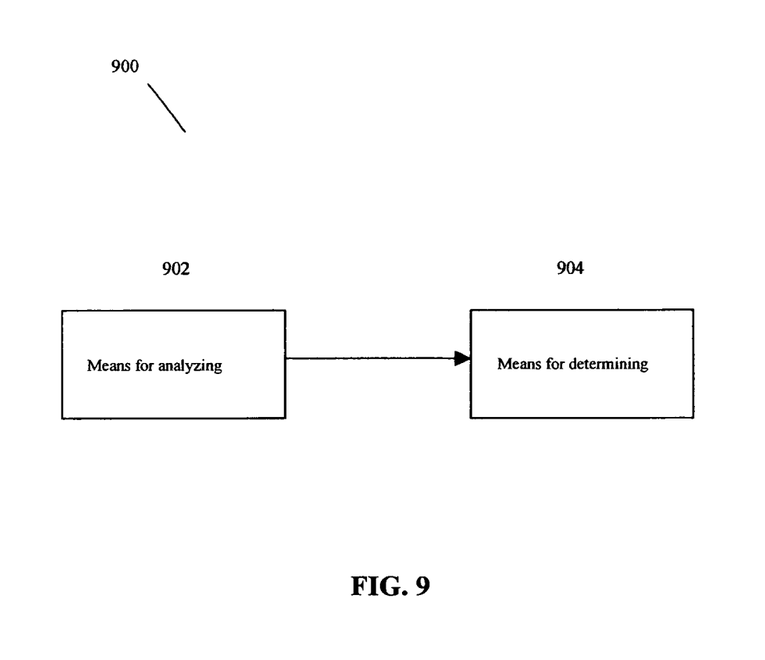
FIG. 9 is a block diagram of an exemplary apparatus constructed in accordance with the embodiment.

FIG. 9 is an exemplary block diagram 900 of an embodiment of the present invention. In FIG. 9, means for analyzing 902 are configured to analyze at least one of two or more data fields related to a data unit in the embodiment. Means for determining 904 then determine device sleep periods in accordance with the analysis of the means for analyzing 902.

OIS and embedded OIS carry information regarding the time interval (offset in super-frames) for which no data will be available for a certain MLC. In other words, this field guarantees that no data will be transmitted by the network for that MLC, for at least the specified time interval. This enables the device to sleep for that duration resulting in decreased power consumption or increased battery life.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by analog and/or digital circuits, discrete components, application-specific integrated circuits, firmware, processor executing appropriate software, and the like, or any combination thereof. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The Detailed Description section should primarily be used to interpret the claims. The Summary and Abstract sections may set forth one or more, but not all exemplary embodiments of the present invention as contemplated by the inventor(s), and thus, are not intended to limit the claims.

What is claimed is:

1. A method for determining sleep periods within a communications device, comprising:
    analyzing, by the communications device, a first overhead portion of a first frame, wherein the first frame comprises at least a plurality of data frames, and wherein the first overhead portion is located at the beginning of the first frame ahead of the plurality of data frames;
    determining, by the communications device, whether data will be available in a second frame subsequent to the first frame based on the analysis independent of decoding one or more of the plurality of data frames and independent of decoding a second overhead portion of the second frame, wherein the second frame is apart from the first frame; and
    determining, by the communications device, the sleep periods based upon the analysis, wherein the analysis provides information associated with frames for which the communications device does not have to wake in order to check for availability of data, wherein the first overhead portion of the first frame comprises a physical layer identification of a user-selected multimedia service.

2. The method of claim 1, wherein the sleep periods are consecutive sleep periods.

3. The method of claim 2, wherein the sleep periods are separated by awake periods.

4. The method of claim 1, wherein the communications device is configured to communicate based upon orthogonal frequency division multiplexed principles.

5. The method of claim 1, wherein the analyzing is based on information from a data layer of a network.

6. The method of claim 1, wherein the first frame is a superframe, and wherein the first overhead portion comprises an Overhead information symbols (OIS) channel within the superframe.

7. The method of claim 1, wherein the first frame is a superframe, wherein the communications device is configured to sleep through a predetermined number of superframes, and wherein the predetermined number is greater than one.

8. An apparatus for determining sleep periods within a communications device configured to communicate via a network, comprising:
  means for analyzing content of a first overhead portion of a first frame, wherein the first frame comprises at least a plurality of data frames, and wherein the first overhead portion is located at the beginning of the first frame ahead of the plurality of data frames;
  means for determining whether data will be available in a second frame subsequent to the first frame based on the analysis independent of decoding one or more of the plurality of data frames and independent of decoding a second overhead portion of the second frame, wherein the second frame is apart from the first frame; and
  means for determining the sleep periods based upon the analysis, wherein the analysis provides information associated with frames for which the communications device does not have to wake up in order to check for availability of data, wherein the first overhead portion of the first frame comprises a physical layer identification of a user-selected multimedia service.

9. The apparatus of claim 8, wherein the sleep periods are consecutive sleep periods.

10. The apparatus of claim 9, wherein the sleep periods are separated by awake periods.

11. The apparatus of claim 8, wherein the communications device is configured to communicate based upon orthogonal frequency division multiplexed principles.

12. The apparatus of claim 8, wherein the analyzing is based on information from a data layer of the network.

13. A transceiver configured to determine sleep periods associated with communicating via a network, comprising:
  a processor configured to:
    analyze content of a first overhead portion of a first frame, wherein the first frame comprises at least a plurality of data frames, and wherein the first overhead portion is located at the beginning of the first frame ahead of the plurality of data frames; and
    determine whether data will be available in a second frame subsequent to the first frame based on the analysis independent of decoding one or more of the plurality of data frames and independent of decoding a second overhead portion of the second frame, wherein the second frame is apart from the first frame; and
  a timer for determining the sleep periods based upon the analysis, wherein the analysis provides information associated with frames for which the transceiver does not have to wake up in order to check for availability of data, wherein the first overhead portion of the first frame comprises a physical layer identification of a user-selected multimedia service.

14. The transceiver of claim 13, wherein the first frame is a superframe, and wherein the first overhead portion comprises an Overhead information symbols (OIS) channel within the superframe.

15. A non-transitory computer readable medium carrying one or more sequences of one or more instructions for execution by one or more processors to perform a method of determining sleep periods within a communications device, the instructions when executed by the one or more processors, cause the one or more processors to perform the steps of:
  analyzing content of a first overhead portion of a first frame, wherein the first frame comprises at least a plurality of data frames, and wherein the first overhead portion is located at the beginning of the first frame ahead of the plurality of data frames;
  determining whether data will be available of decoding one or more of the plurality of first frame based on the analysis independent of decoding one or more of the plurality of data frames and independent of decoding a second overhead portion of the second frame, wherein the second frame is apart from the first frame; and
  determining the sleep periods based upon the analysis, wherein the analysis provides information associated with frames for which the communications device does not have to wake up in order to check for availability of data, wherein the information pertains to multimedia content requested by the communications device.

16. The non-transitory computer readable medium of claim 15, wherein the sleep periods are consecutive sleep periods.

17. The non-transitory computer readable medium of claim 15, wherein the communications device is configured to communicate based upon orthogonal frequency division multiplexed principles.

18. The non-transitory computer readable medium of claim 15, wherein the analyzing is based on information from a data layer of a network.

* * * * *